United States Patent
Nakamura et al.

(10) Patent No.: US 9,835,230 B2
(45) Date of Patent: Dec. 5, 2017

(54) AUTOMATIC TRANSMISSION FOR VEHICLE

(71) Applicant: AISIN SEIKI KABUSHIKI KAISHA, Kariya-shi, Aichi-ken (JP)

(72) Inventors: Hideki Nakamura, Anjo (JP); Kiyoharu Takagi, Okazaki (JP); Atsuhiro Mase, Aichi-ken (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 78 days.

(21) Appl. No.: 14/969,471

(22) Filed: Dec. 15, 2015

(65) Prior Publication Data

US 2016/0169348 A1  Jun. 16, 2016

(30) Foreign Application Priority Data

Dec. 16, 2014  (JP) .................................. 2014-253559

(51) Int. Cl.
| | |
|---|---|
| *F16H 3/62* | (2006.01) |
| *F16H 3/44* | (2006.01) |
| *F16H 37/06* | (2006.01) |
| *F16H 3/66* | (2006.01) |

(52) U.S. Cl.
CPC ....... *F16H 3/66* (2013.01); *F16H 2200/0078* (2013.01); *F16H 2200/201* (2013.01); *F16H 2200/2056* (2013.01); *F16H 2200/2064* (2013.01); *F16H 2200/2094* (2013.01)

(58) Field of Classification Search
CPC ................. F16H 2200/2064; F16H 2200/2094
See application file for complete search history.

(56) References Cited

U.S. PATENT DOCUMENTS

| | | | | |
|---|---|---|---|---|
| 5,890,988 | A | * | 4/1999 | Kasuya ..................... F16H 3/66 192/215 |
| 7,131,926 | B2 | | 11/2006 | Tiesler et al. |
| 7,828,688 | B2 | | 11/2010 | Phillips et al. |
| 7,963,877 | B2 | | 6/2011 | Wittkopp et al. |
| 2013/0090202 | A1 | * | 4/2013 | Hiraiwa ................. B60K 6/445 475/5 |
| 2013/0244826 | A1 | * | 9/2013 | Iizuka ....................... F16H 3/62 475/276 |
| 2016/0025189 | A1 | * | 1/2016 | Kaltenbach ............... F16H 3/66 475/5 |
| 2016/0061304 | A1 | * | 3/2016 | Kaltenbach ............... F16H 3/66 475/5 |

\* cited by examiner

*Primary Examiner* — Tisha Lewis
(74) *Attorney, Agent, or Firm* — Buchanan Ingersoll & Rooney PC

(57) ABSTRACT

An automatic transmission includes a second planetary gear mechanism having a sun gear, a carrier, and a ring gear being defined as first, second and third elements, respectively, when a single pinion type planetary gear mechanism is applied; the carrier, the ring gear, and the sun gear being defined as the first, second, and third elements, respectively, when a double pinion type is applied; a first brake, a switching clutch being switchable to a first position where the third element is selectively fixed to a housing; a first clutch, a second clutch, a third clutch, and a fourth clutch. The first brake fixes a sun gear of a first planetary gear mechanism, the switching clutch fixes the third element to the housing, and the fourth clutch connects the second element to a carrier of the third planetary gear mechanism when establishing a reverse speed stage.

2 Claims, 6 Drawing Sheets

|  | CL1 | CL2 | CL3 | CL4 | B1 | B2 | D |
|---|---|---|---|---|---|---|---|
| 1st | ○ |  | ○ |  |  | ○ | b |
| 2nd |  | ○ | ○ |  |  | ○ | b |
| 3rd | ○ | ○ |  |  |  | ○ | b |
| 4th |  | ○ |  | ○ |  | ○ | b |
| 5th |  |  |  | ○ | ○ | ○ | b |
| 6th | ○ |  |  | ○ |  | ○ | b |
| 7th | ○ |  |  | ○ | ○ |  | b |
| 8th (b) | ○ |  | ○ | ○ |  |  | b |
| 8th (c) | ○ |  |  | ○ |  |  | c |
| 9th | ○ |  |  |  | ○ |  | c |
| 10th (c1) |  |  |  | ○ | ○ |  | c |
| 10th (c2) |  |  | ○ |  | ○ |  | c |
| 10th (b) |  |  | ○ | ○ | ○ |  | b |
| 11th | ○ |  | ○ |  | ○ |  | b |
| 12th |  | ○ | ○ |  | ○ |  | b |
| Rev |  |  |  | ○ | ○ |  | a |

|  | CL11 | CL12 | CL13 | CL14 | B11 | B12 |
|---|---|---|---|---|---|---|
| 1st |  | ◯ | ◯ |  |  | ◯ |
| 2nd | ◯ | ◯ |  |  |  | ◯ |
| 3rd |  | ◯ |  |  | ◯ | ◯ |
| 4th |  | ◯ |  | ◯ |  | ◯ |
| 5th |  | ◯ |  | ◯ | ◯ |  |
| 6th | ◯ | ◯ |  | ◯ |  |  |
| 7th | ◯ |  |  | ◯ | ◯ |  |
| 8th |  |  | ◯ | ◯ | ◯ |  |
| 9th | ◯ |  | ◯ |  | ◯ |  |
| 10th |  | ◯ | ◯ |  | ◯ |  |
| Rev |  | ◯ |  | ◯ |  | ◯ |

FIG. 11

|      | CL1 | CL2 | CL3 | CL4 | B1 | B2 |
|------|-----|-----|-----|-----|----|----|
| 1st  | ○   |     | ○   |     |    | ○  |
| 2nd  |     | ○   | ○   |     |    | ○  |
| 3rd  | ○   | ○   |     |     |    | ○  |
| 4th  |     | ○   |     | ○   |    | ○  |
| 5th  |     |     |     | ○   | ○  | ○  |
| 6th  | ○   |     |     | ○   |    | ○  |
| 7th  | ○   |     |     | ○   | ○  |    |
| 8th  | ○   |     | ○   | ○   |    |    |
| 9th  |     |     | ○   | ○   | ○  |    |
| 10th | ○   |     | ○   |     | ○  |    |
| 11th |     | ○   | ○   |     | ○  |    |
| Rev  |     | ○   |     | ○   | ○  |    |

AUTOMATIC TRANSMISSION FOR VEHICLE

CROSS REFERENCE TO RELATED APPLICATIONS

This application is based on and claims priority under 35 U.S.C. §119 to Japanese Patent Application 2014-253559, filed on Dec. 16, 2014, the entire content of which is incorporated herein by reference.

TECHNICAL FIELD

This disclosure generally relates to an automatic transmission for a vehicle.

BACKGROUND DISCUSSION

Known automatic transmissions for vehicle are disclosed in U.S. Pat. No. 7,828,688 (hereinafter referred to as Patent reference 1) and U.S. Pat. No. 7,131,926 (hereinafter referred to as Patent reference 2). The known automatic transmissions disclosed in Patent references 1 and 2 include three single pinion type planetary gear mechanisms and six engaging elements including two brakes and four clutches, and establish ten forward speeds and one reverse speed by engaging three elements among six engaging elements. As illustrated in FIG. 7, first, second, and third planetary gear mechanisms P11, P12, P13 are arranged in the mentioned order in a row from an input shaft N side to an output shaft T side. Elements that structure the first, second, and third planetary gear mechanisms P11, P12. P13 are referred to as first, second, and third carriers C11, C12, C13 that rotatably support first, second, and third pinions Q11, Q12, Q13, first, second, and third sun gears S11, S12, S13, and first, second, and third ring gears R11, R12, R13.

The second carrier C12 is connected to the input shaft N. The second ring gear R12 is connected to the third sun gear S13. The second sun gear S12 is selectively fixed to a housing H by a first brake B11 and is selectively connected to the first sun gear S11 by a second clutch CL12. The second carrier C12 is selectively connected to the first sun gear S11 by a first clutch CL11.

The second ring gear R12 is selectively connected to the first carrier C11 by a third clutch CL13. The first ring gear R11 is connected to the third carrier C13. The first carrier C11 is selectively connected to the third ring gear R13 by a fourth clutch CL14. The third ring gear R13 is selectively fixed to the housing H by a second brake B12. The third carrier C13 is connected to the output shaft T.

FIG. 8 shows operation states of clutches CL11, CL12, CL14 and brakes B11, B12, the operation states corresponding to each of speed stages. A circle marked in FIG. 8 indicates that the element is engaged. FIG. 9 shows a velocity diagram in which the sun gears S11, S12, S13, the carriers C11, C12, C13, and the ring gears R11, R12, R13 that are elements for structuring the first, second and third planetary gear mechanisms P11, P12, P13 when establishing a reverse speed, or reverse speed stage are arranged with intervals corresponding to gear ratios λ1, λ2, λ3 in a lateral axis direction, and rotation speed ratios corresponding to the elements are arranged in a vertical direction.

As shown in FIG. 9, according to an automatic transmission 12 for vehicle disclosed in Patent references 1 and 2, when establishing a reverse speed, the engaged state of the first clutch CL11 is established so that a rotation drive force of the input shaft N is inputted to the first sun gear S11. Further, drive force for reverse rotation is generated at the first ring gear R11 by connecting the first carrier C11 and the third ring gear R13 by establishing the engaged state of the fourth clutch CL14, and by fixing the first carrier C11 by establishing the engaged state of the second brake B12. The drive force for reverse rotation of the first ring gear R11 is outputted to the output shaft T via the third carrier C13. That is, according to the automatic transmission 12 for vehicle, the drive force for reverse rotation is generated only by the braking operation to the first planetary gear mechanism P11 and the input to the first planetary gear mechanism P11.

Then, because the third ring gear R13 is fixed and the third carrier C13 rotates in a reverse direction, the third sun gear S13 passively rotates in the reverse direction at speed faster than the third carrier C13. Further, because the second ring gear R12 is connected to the third sun gear S13, the second ring gear R12 rotates in the reverse direction. Because the rotation of the input shaft N is inputted to the second carrier C12, the second sun gear S12 comes to rotate at the high speed. That is, a rotation speed ratio of the second sun gear S12 corresponds to a value H that is calculated by adding an input rotation speed ratio to a value obtained by multiplying the reciprocal of the gear ratio λ2 (=the number of teeth of the second sun gear S12/the number of teeth of the second ring gear R12) and the sum of the absolute value of the rotation speed ratio of the second ring gear R12 and the input rotation speed ratio.

Thus, the second clutch CL12 that selectively engages the second sun gear S12 with the first sun gear S11 and the first brake B11 that selectively engages the second sun gear S12 to the housing H may be susceptible to the generation of the burning because a relative rotation speed is increased. Further, the durability of a bearing or the like that supports the second sun gear S12 declines significantly. In a case where an oil passage is formed at a shaft connected to the second sun gear S12, the durability of a sealing disposed on the shaft may be declined.

A need thus exists for an automatic transmission for a vehicle which is not susceptible to the drawback mentioned above.

SUMMARY

In light of the foregoing, the disclosure provides an automatic transmission, which includes a housing, and three planetary gear mechanisms including a first planetary gear mechanism which is a single pinion type planetary gear mechanism, a second planetary gear mechanism which is one of a single pinion type planetary gear mechanism and a double pinion type planetary gear mechanism, and a third planetary gear mechanism which is a single pinion type planetary gear mechanism, the first planetary gear mechanism, the second planetary gear mechanism, and the third planetary gear mechanism being supported by the housing and being coaxial to a rotation axis; a sun gear, a carrier, and a ring gear of the second planetary gear mechanism in an arranged order in a velocity diagram being defined as a first element, a second element, and a third element, respectively, in a case where the single pinion type planetary gear mechanism is applied as the second planetary gear mechanism; the carrier, the ring gear, and the sun gear of the second planetary gear mechanism in an arranged order in a velocity diagram being defined as the first element, the second element, and the third element, respectively, in a case where the double pinion type planetary gear mechanism is applied as the second planetary gear mechanism; a ring gear of the first planetary gear mechanism and a sun gear of the third planetary gear mechanism being connected to each other, and the first element of the second planetary gear mechanism and a ring gear of the third planetary gear mechanism being connected to each other. The automatic transmission further includes an input shaft supported by the housing to be rotatable about the rotation axis, the input shaft connected to a carrier of the first planetary gear mechanism, an output shaft supported by the housing to be rotatable about the rotation axis, the output shaft connected to a carrier of the third planetary gear mechanism, a first brake selectively fixing a sun gear of the first planetary gear mechanism to the housing, a second brake selectively fixing the first element and the ring gear of the third planetary gear mechanism which are connected to each other to the housing, a switching clutch being switchable to a first position where the third element is selectively fixed to the housing, to a second position where the third element is selectively fixed to the first element and the ring gear of the third planetary gear mechanism, or to a third position where the third element is free from the housing and is free from the first element and the ring gear of the third planetary gear mechanism, a first clutch selectively connecting the carrier of the first planetary gear mechanism and the third element, a second clutch selectively connecting the sun gear of the first planetary gear mechanism and the third element, a third clutch selectively connecting the ring gear of the first planetary gear mechanism and the second element, and a fourth clutch selectively connecting the second element and the carrier of the third planetary gear mechanism. The first brake fixes the sun gear of the first planetary gear mechanism to the housing, the switching clutch fixes the third element to the housing, and the fourth clutch connects the second element to the carrier of the third planetary gear mechanism when establishing a reverse speed stage.

BRIEF DESCRIPTION OF THE DRAWINGS

The foregoing and additional features and characteristics of this disclosure will become more apparent from the following detailed description considered with the reference to the accompanying drawings, wherein:

FIG. 11 shows operation states of brakes and clutches at each of speed stages of the comparison example.

DETAILED DESCRIPTION

Figures 1, 2:
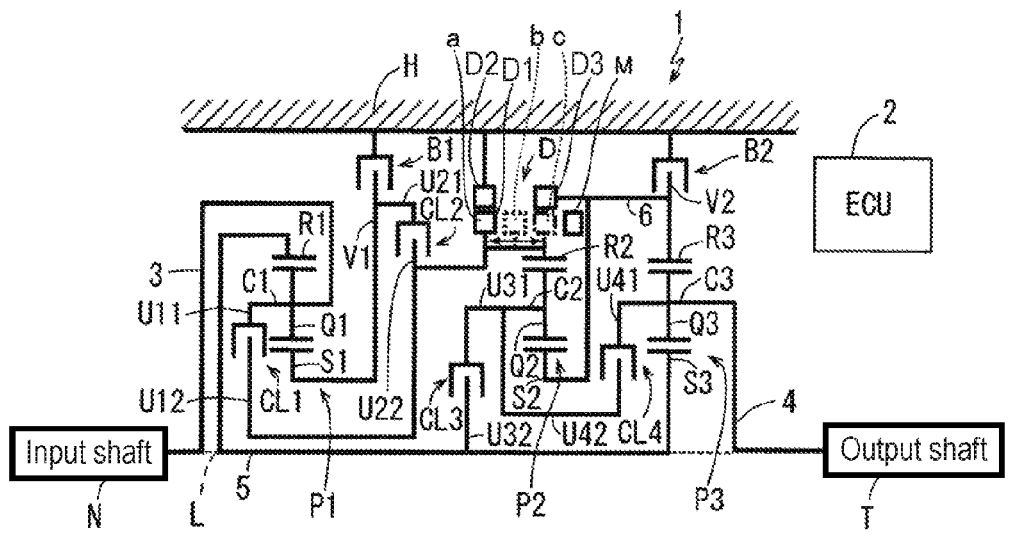
FIG. 1 is a schematic diagram of an automatic transmission for a vehicle according to an embodiment disclosed here.
FIG. 2 shows operation states of brakes and clutches at each of speed stages according to the embodiment disclosed here.

Mechanical structure of an automatic transmission for a vehicle according to the embodiment will be explained as follows. The embodiment of the automatic transmission for the vehicle will be described with reference to illustrations of drawing figures as follows. The automatic transmission for the vehicle is applied as a device for changing the speed of a rotation drive force outputted from an engine which is mounted to the vehicle. The rotation drive force of which the speed is changed by the automatic transmission for the vehicle is transmitted to driving wheels via a differential device, for example, and the vehicle moves forwards or backwards at a predetermined speed stage that is established by the automatic transmission for the vehicle.

A schematic construction of an automatic transmission 1 for a vehicle will be explained with reference to FIG. 1. The automatic transmission 1 for the vehicle includes three single pinion type planetary gear mechanisms P1, P2, P3 (first to third planetary gear mechanisms P1, P2, P3) that are arranged in a direction of an axis from an input side (i.e., left-hand side in FIG. 1) towards an output side (i.e., right-hand side in FIG. 1), four clutches CL1, CL2, CL3, CL4 (first to fourth clutches CL1, CL2, CL3, CL4) selectively connecting elements that construct each of the planetary gear mechanisms P1, P2, P3, and two brakes B1, B2 (first and second brakes B1, B2) selectively engaging a predetermined element to a housing H.

The automatic transmission 1 for the vehicle further includes a switching clutch D that is switchable to a first position a for selectively fixing a predetermined element to the housing H, a second position c for selectively fixing predetermined elements each other, and a third position b where the predetermined element is free from the housing H and the predetermined element. The automatic transmission 1 for the vehicle further includes connection members 5, 6 connecting predetermined elements, connection members U11, U21, U31, U41, U12. U22, U32, U42 that connect the predetermined elements and the clutches CL1, CL2, CL3, CL4, connection members V1, V2 for fixing, or connecting the brake B1, B2 and the predetermined element, an input shaft N, and an output shaft T.

Further, according to the automatic transmission 1 for the vehicle, operation states of engaging elements including the first to fourth clutches CL1, CL2, CL3, CL4 and the first and second brakes B1, B2, and operation states of the switching clutch D are controlled on the basis of control signals from a vehicle control ECU (electronic control unit) 2. According to the embodiment, by actuating three or two engaging elements among the above described engaging elements including the first to fourth clutches CL1, CL2, CL3, CL4 and the brakes B1, B2, and by actuating the switching clutch D, a speed of a rotation drive force inputted from the input shaft N is changed to one of twelve forward speeds and one rearward speed to be outputted from the output shaft T. Details of the speed stages to be established and the operation states of the engaging elements according to the automatic transmission 1 for the vehicle will be described hereinafter.

The input shaft N and the output shaft T are supported by the housing H to be rotatable about a rotation axis L. The input shaft N is a shaft member that inputs the rotation drive force of the engine to the automatic transmission 1 for the vehicle via, for example, a clutch device. The output shaft T is disposed coaxially to the input shaft N and outputs the rotation drive force with changed speed to driving wheels via a differential device, for example.

Each of the planetary gear mechanisms P1, P2, P3 is a single pinion type planetary gear mechanism in which the pinion gears Q1, Q2, Q3 that are rotatably supported by the carriers C1, C2, C3, respectively, are meshed with the sun gears S1, S2, S3 and the ring gears R1, R2, R3, respectively. The first to third planetary gear mechanisms P1, P2, P3 are arranged in the mentioned order from the input side (the side where the input shaft N is located). Elements of each of the planetary gear mechanisms P1, P2, P3 are defined as the first, second and third sun gears S1, S2, S3, the first, second and third carriers C1, C2, C3, and the first, second and third ring gears R1 to R3, respectively. According to the embodiment, because the second planetary gear mechanism P2 that is a single pinion type planetary gear mechanism is applied, among the elements of the second planetary gear mechanism P2, the second sun gear S2 corresponds to a first element, the second carrier C2 corresponds to a second element, and the second ring gear R2 corresponds to a third element of the disclosure in an arrangement order in the velocity diagram shown in FIG. 3.

The first planetary gear mechanism P1 includes the first sun gear S1 (serving as a sun gear of a first planetary gear mechanism), the plural first pinion gears Q1, the first carrier C1 (serving as a carrier of a first planetary gear mechanism), and the first ring gear R1 (serving as a ring gear of a first planetary gear mechanism). The first sun gear S1 is meshed with the plural first pinion gears Q1, the plural first pinion gears Q1 are rotatably supported by the first carrier C1 and are meshed with the first ring gear R1. The first ring gear R1 is rotatably supported to be coaxial with the rotation axis L.

The second planetary gear mechanism P2 includes the second sun gear S2, the plural second pinion gears Q2, the second carrier C2, and the second ring gear R2. The second sun gear S2 is meshed with the plural second pinion gears Q2, the plural second pinion gears Q2 are rotatably supported by the second carrier C2 and are meshed with the second ring gear R2. The second carrier C2 is rotatably supported to be coaxial with the rotation axis L.

The third planetary gear mechanism P3 includes the third sun gear S3 (serving as a sun gear of a third planetary gear mechanism), the plural third pinion gears Q3, the third carrier C3 (serving as a carrier of a third planetary gear mechanism), and the third ring gear R3 (serving as a ring gear of a third planetary gear mechanism). The third sun gear S3 is meshed with the plural third pinion gears Q3, the plural third pinion gears Q3 are rotatably supported by the third carrier C3 and are meshed with the third ring gear R3. The third sun gear S3 is rotatably supported to be coaxial with the rotation axis L.

The first ring gear R1 and the third sun gear S3 are connected via a first gear connection member 5 that extends in the axial direction passing through an inner side relative to the first sun gear S1. The second sun gear S2 and the third ring gear R3 are connected via a second gear connection member 6 that extends in the axial direction passing through an outer side relative to the second sun gear S2 and the third ring gear R3. Components of the switching clutch D are provided at the second gear connection member 6.

Each of the brakes B1, B2 is an engaging element provided at the housing H and braking the rotation of the predetermined element. According to the embodiment, similar to the clutches CL1, CL2, CL3, CL4, a hydraulic type brake that is actuated by a hydraulic pressure supplied from an oil passage formed on the housing H is applied as each of the brakes B1, B2. Thus, each of the brakes B1, B2 brakes the rotation of the targeted predetermined element by applying pads to a disc upon the supply of the hydraulic pressure from a hydraulic pressure pump that actuates on the basis of a control command, for example, by the control ECU 2. Then, when the supply of the hydraulic pressure by the hydraulic pressure pump is blocked, the pads are released from the disc to allow the rotation of the predetermined element.

The first brake B1 brakes the rotation of the first sun gear S1 connected to the first brake connection member (serving as a connection member for first brake) V1 via the first brake connection member V1. The second brake B2 brakes the rotation of the third ring gear R3 connected to the second brake connection member V2 via the second brake connection member V2 and brakes the rotation of the second sun gear S2 connected to the second gear connection member 6 via the second brake connection member V2 connected to the second gear connection member 6.

Each of the clutches CL1, CL2, CL3, CL4 is an engaging element that allows selective engagement of plural elements each other. According to the embodiment, each of the clutches CL1, CL2, CL3, CL4 is a normally open hydraulic pressure type clutch that actuates in response to a supplied hydraulic pressure. Thus, upon the supply of a hydraulic pressure from a hydraulic pressure pump that actuates based on a control command by the ECU 2, for example, via the input shaft N and oil passages formed on the housing H, each of the clutches CL1, CL2, CL3, CL4 makes plural clutch plates contact one another to connect the elements so that a drive force is transmitted between the targeted elements. Then, when the supply of the hydraulic pressure by the hydraulic pressure pump is blocked, the clutch plates come to be separated from one another and the elements are disengaged from each other so that the drive force is not transmitted between the targeted elements.

A first end of the first clutch CL1 is connected to the first carrier C1 via a first portion U11 of a first-clutch connection member (serving as a connection member for first clutch). A second end of the first clutch CL1 is connected to the second ring gear R2 via a second portion U12 of the first-clutch connection member. The first clutch CL1 selectively engages the first carrier C1 and the second ring gear R2 (the first clutch connects the first carrier C1 and the second ring gear R2 to be disengageable). Components of the switching clutch D is provided at the second portion U12 of the first-clutch connection member U12.

A first end of the second clutch CL2 is connected to the first sun gear S1 via a first portion U21 of a second-clutch connection member connected to the first brake connection member V1. A second end of the second clutch CL2 is connected to the second ring gear R2 via a second portion U22 of the second-clutch connection member connected to the second portion U12 of the first-clutch connection member. The second clutch CL2 selectively connects the first sun gear S1 and the second ring gear R2 (the second clutch CL2 connects the first sun gear S1 and the second ring gear R2 to be disengageable from each other).

A first end of the third clutch CL3 is connected to the second carrier C2 via a first portion U31 of a third-clutch connection member. A second end of the third clutch CL3 is connected to the first ring gear R1 and the third sun gear S3 via a second portion U32 of the third-clutch connection member that is connected to the first gear connection member 5. The third clutch CL3 selectively connects the first ring gear R1 and the third sun gear S3 to the second carrier C2 (the third clutch CL3 connects the first ring gear R1 and the third sun gear S3 to the second carrier C2 to be disengageable).

A first end of the fourth clutch CL4 is connected to the third carrier C3 via a first portion U41 of a fourth-clutch connection member (serving as a connection member for fourth clutch). A second end of the fourth clutch CL4 is connected to the third carrier C3 via a second portion U42 of the fourth-clutch connection member U42 that is connected to the third-clutch connection member U31. The fourth clutch CL4 selectively connects the second carrier C2 and the third carrier C3 (the fourth clutch CL4 connects the second carrier C2 and the third carrier C3 to be disengageable).

The switching clutch D switches positions to the first position a for selectively fixing the second ring gear R2 to the housing H via the first portion U12 of the first-clutch connection member, to the second position c for selectively fixing the second ring gear R2 to the second sun gear S2 connected to the second gear connection member 6 and the third ring gear R3, and to the third position b where the second ring gear R2 is free from the housing H and from the second sun gear S2 and the third ring gear R3.

For example, a dog clutch, a wet clutch, or a synchromesh mechanism, or the like, is applicable as the switching clutch D. A hydraulic pressure or a motor, or the like, is applicable, for example, as a drive source M for the switching clutch D. In a case where a dog clutch is applied as the switching clutch D, a gear D1 which is slidable in an axial direction is provided at the first portion U12 of the first-clutch connection member, a gear D2 which is engageable with the gear D1 is provided at the housing H, and a gear D3 which is engageable with the gear D1 is provided at the second gear connection member 6.

The input shaft N is connected to the first carrier C1 via an input shaft connection member 3 that extends outwardly in a radial direction from the rotation axis L and extends in the axial direction passing through an outer side relative to the first ring gear R1. The output shaft T is connected to the third carrier C3 via an output shaft connection member 4 that extends outwardly in a radial direction from the rotation axis L.

An operation of the automatic transmission 1 for the vehicle according to the embodiment will be explained as follows. The automatic transmission 1 for the vehicle described above establishes twelve forward speeds and one rearward speed by the selective operation of the first, second, third, and fourth clutches CL1, CL2, CL3, CL4, the first and second brakes B1, B2, and the switching clutch D to restrict the rotation of elements of the first, second, and third planetary gear mechanisms P1, P2, P3. FIG. 2 shows operation states of each of the clutches CL1, CL2, CL3, CL4, each of the brakes B1, B2, and the switching clutch D. A circle marked in FIG. 2 indicates that the selected clutch CL1, CL2, CL3, CL4 and the brake B1, B2 are in an engaged state. The indication of "a" in a column for the switching clutch D shows that "a" in FIG. 1 and the gear D2 are in an engaged state (i.e., first position a). The indication of "c" in the column for the switching clutch D shows that "c" in FIG. 1 and the gear D3 are in an engaged state (i.e., second position c). The indication of "b" in the column for the switching clutch D shows that none of the elements "a", "c" are engaged with the gears D2, D3 (i.e., third position b; released state).

For example, according to an operative engagement table (see FIG. 2), in a first shift stage (first speed) of the automatic transmission 1 for the vehicle, the first clutch CL1, the third clutch CL3, and the second brake B2 are in the engaged state and the switching clutch D is in "b" state, that is the switching clutch D is in a released state. In this state, by the engagement of the first clutch CL1, the first carrier C1 and the second ring gear R2 integrally rotate, and by the engagement of the third clutch CL3, the first ring gear R1, the second carrier C2, and the third sun gear S3 integrally rotate. Because the second sun gear S2 is fixed by the second brake B2, the rotation drive force of the input shaft N outputted from the first carrier C1 is transmitted to the third sun gear S3 via the second carrier C2. The speed of the rotation drive force inputted from the third sun gear S3 is reduced with a gear ratio in accordance with the number of teeth because the third ring gear R3 is fixed by the second brake B2, and the rotation drive force is transmitted from the third carrier C3 to the output shaft T via the output shaft connection member 4.

In order to change the shift stages from the first speed (first shift stage) to the second speed (second shift stage), according to the automatic transmission 1 for the vehicle, the actuated engaging element is switched from the first clutch CL1 to the second clutch CL2 while maintaining the engagement of the third clutch CL3 and the second brake B2, and maintaining the "b" state (released state) of the switching clutch D. In this state, first, by the engagement of the second clutch CL2, the first sun gear S1 and the second ring gear R2 are integrally rotated, and the first ring gear R1, the second carrier C2, and the third sun gear S3 are integrally rotated by the engagement of the third clutch CL3. The rotation drive force of the input shaft N outputted from the first carrier C1 is shared by the first sun gear S1 and the first ring gear R1. Because the second sun gear S2 is fixed by the second brake B2, the rotation drive force outputted from the first sun gear S1 is transmitted from the second carrier C2 to the third sun gear S3. Because the third ring gear R3 is fixed by the second brake B2, the speed of the rotation drive force inputted from the third sun gear S3 is reduced with a gear ratio in accordance with the number of teeth, and the rotation drive force is transmitted to the output shaft T from the third carrier C3 via the output shaft connection member 4.

Figure 3:
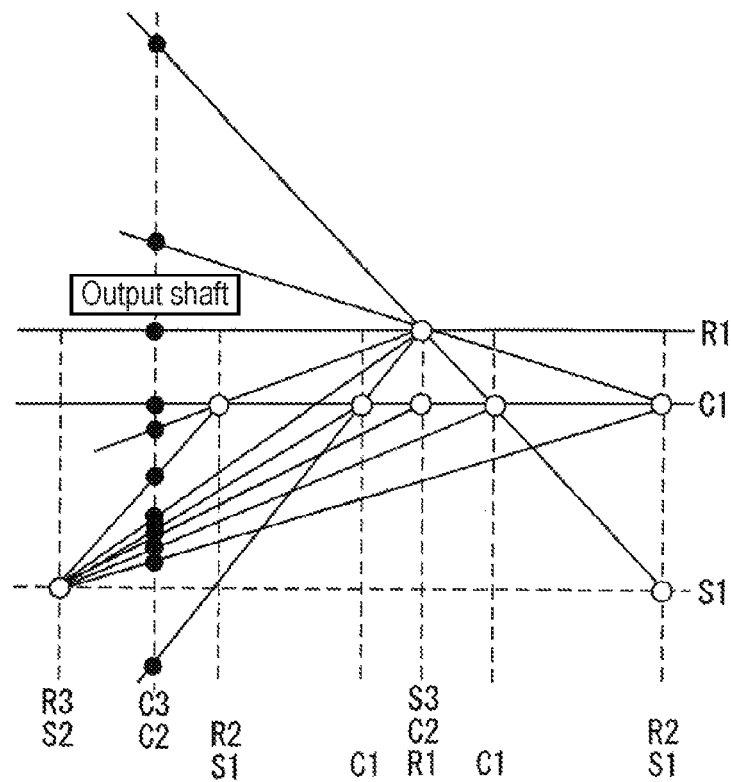
FIG. 3 shows a velocity diagram showing a rotation speed ratio of each element that structures a planetary gear mechanism at each of speed stages according to the embodiment disclosed here.

According to the automatic transmission 1 for the vehicle, by selectively actuating three engaging elements among six engaging elements and by maintaining the "b" state (released state) of the switching clutch D, as illustrated in the velocity diagram in FIG. 3, multiple speeds (multiple shift stages) having different gear ratios from one another (from the first shift stage to the eighth shift stage) are established. Further, according to the automatic transmission 1 for the vehicle, as shown in the operative engagement table shown in FIG. 2, by changing one of three actuated engaging elements while maintaining the "b" state (released state) of the switching clutch D, the shift stage is changed to an adjacent shift stage.

Figure 10:
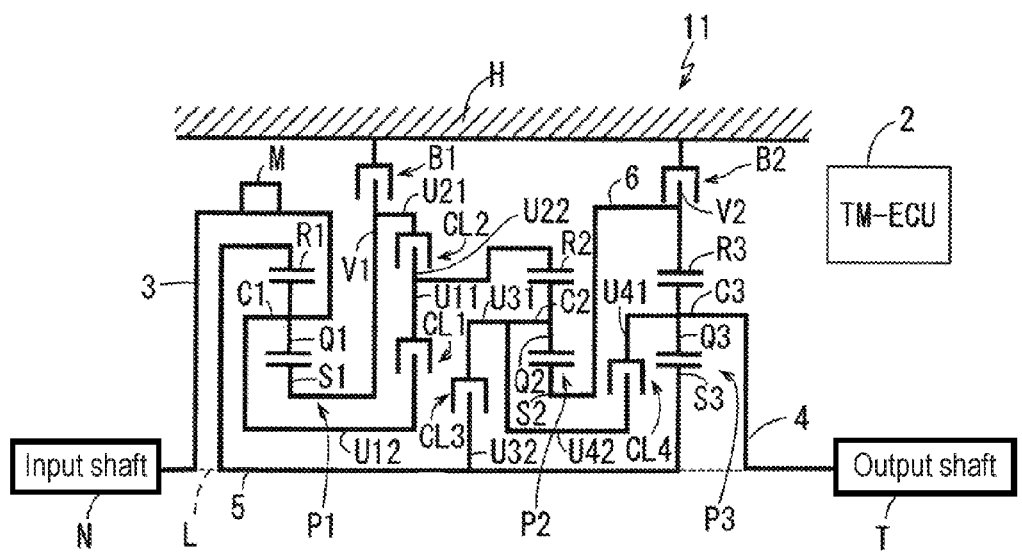
FIG. 10 is a schematic diagram of a comparison example of an automatic transmission for a vehicle.

As illustrated in FIG. 10, the automatic transmission 1 for the vehicle in which the switching clutch D is in "b" state (released state) can be replaced by an automatic transmission 11 for a vehicle having the same structure with the automatic transmission 1 for the vehicle except for not including the switching clutch D (hereinafter, referred to as the automatic transmission 11 for the vehicle of a comparison example). As shown in the operative engagement table in FIG. 11, the automatic transmission 11 for the vehicle of the comparison example corresponds to a transmission establishing eleven forward speeds and one reverse speed. As shown in the operative engagement table in FIG. 2, the automatic transmission 1 for the vehicle of the embodiment establishes twelve forward speeds and one reverse speed.

The engagement state of the clutches and the brakes of the automatic transmission 11 for the vehicle of the comparison example from the first speed (first shift stage) to the eighth speed (eighth shift stage) is the same with the engagement state of the clutches and the brakes of the automatic transmission 1 for the vehicle of the embodiment from the first speed (first shift stage) to the eighth speed (eighth shift stage). The engagement state of the clutches and the brakes of the automatic transmission 11 for the vehicle of the comparison example from the ninth speed (ninth shift stage) to the eleventh speed (eleventh shift stage) is the same with the engagement state of the clutches and the brakes of the automatic transmission 1 for the vehicle of the embodiment from the tenth speed (tenth shift stage) to the twelfth speed (twelfth shift stage). That is, the ninth speed (ninth shift stage) of the automatic transmission 1 for the vehicle of the embodiment cannot be obtained by the automatic transmission 11 for the vehicle of the comparison example.

Accordingly, the automatic transmission 1 for the vehicle of the embodiment can obtain an additional shift stage (ninth shift stage; ninth speed) compared to the automatic transmission 11 for the vehicle of the comparison example by the addition of the switching clutch D. As described above, according to the automatic transmission 1 for the vehicle of the embodiment, by changing (switching) one of three actuated engaging elements while maintaining the "b" state (released state) of the switching clutch D, the shift stage can be changed to an adjacent shift stage in a range from the first speed (first shift stage) to the eighth speed (eighth shift stage; referred to as $8^{th}$ (b)).

Notwithstanding, according to the automatic transmission 1 for the vehicle of the embodiment in order to change shift stages from the eighth speed ($8^{th}$ (b)) to the ninth speed, it is necessary to switch the switching clutch D from the "b" state (released state) to the "c" state (engaged state), to release the third and fourth clutches CL3, CL4, and to establish the engaged state of the first brake B1. That is, according to the automatic transmission 1 for the vehicle of the embodiment, there is a drawback that operation time for controlling the hydraulic pressure is increased because it is necessary to switch the engagement (actuation) of the engaging elements, that is, switching two of three actuated engaging elements to another actuated engaging element.

Thus, according to the construction of the automatic transmission 1 for the vehicle of the embodiment, the switching clutch D is switched from the "b" state (released state) to the "c" state (engaged state) at the eighth shift stage (eighth speed; referred to as $8^{th}$ (b)), and then, the third clutch CL3 only among the first, third, and fourth clutches CL1, CL3, CL4 is operated to be released, that is, one of three engaging elements which are in the engaged state is switched to the released state to transit to another eighth shift stage (another eighth speed; referred to as $8^{th}$ (c)) temporarily.

Accordingly, with the construction of the automatic transmission 1 for the vehicle of the embodiment, when shifting the shift stage from the eighth shift stage (the mentioned another eighth speed; referred to as $8^{th}$ (c)) to the ninth shift stage (ninth speed), the fourth clutch CL4 among the first and fourth clutches CL1, CL4 is released and the engaged state of the first brake is established while maintaining the "c" state (engaged state) of the switching clutch D. That is, the operation time for controlling the hydraulic pressure is shortened because the shift stage is changed by switching one of the actuated engaging elements among two engaging elements which are in engaged states. Similar operation is applied for the transition of the shift stages from the ninth shift stage (ninth speed) to the tenth shift stage (tenth speed; referred to as $10^{th}$ (c1)).

Notwithstanding, according to the automatic transmission 1 for the vehicle of the embodiment, it is necessary to switch the switching clutch D from the "c" state (engaged state) to the "b" state (released state), to release the fourth clutch CL4 among the fourth clutch CL4 and the first brake B1, and to establish the engaged states of the first and third clutches CL1, CL3 That is, according to the automatic transmission 1 for the vehicle of the embodiment, there is a drawback that operation time for controlling the hydraulic pressure is increased because it is necessary to switch the engagement (actuation) of the engaging elements, that is, switching actuated engaging elements from one to other two engaging elements.

Thus, according to the automatic transmission 1 for the vehicle, the switching clutch D is maintained at the "c" state (engaged state) at the tenth shift stage (tenth speed; referred to as $10^{th}$ (c1)), and then, the third clutch CL3 is engaged while maintaining the engaged states of the fourth clutch CL4 and the first brake B1 to transit the shift stage to another tenth shift stage (another tenth speed; referred to as $10^{th}$ (c2)) temporarily.

Further, according to the automatic transmission 1 for the vehicle, at the tenth shift stage (the mentioned another tenth speed; referred to as $10^{th}$ (c2)), the switching clutch D is switched from the "c" state (engaged state) to the "b" state (released state) to transit the shift stage to still another tenth shift stage (still another tenth speed; referred to as $10^{th}$ (b)) temporarily.

Accordingly, with the construction of the automatic transmission 1 for the vehicle of the embodiment, when shifting the shift stage from the tenth shift stage (the mentioned still another tenth speed; referred to as $10^{th}$ (b)) to the eleventh shift stage (eleventh speed), the fourth clutch CL4 among the third and fourth clutches CL3, CL4 and the first brake B1 is released and the engaged state of the first clutch CL1 is established while maintaining the "b" state (released state) of the switching clutch D. That is, the operation time for controlling the hydraulic pressure is shortened because the shift stage is changed by switching one of the actuated engaging elements among three engaging elements which are in engaged states.

Figure 9:
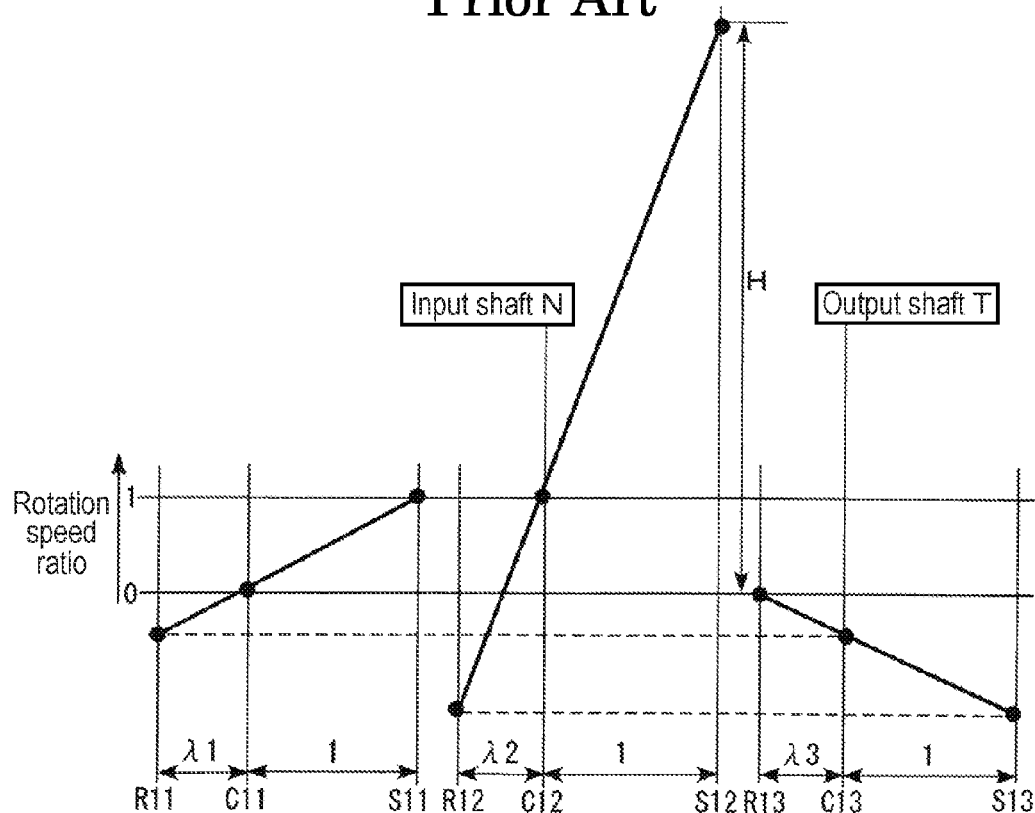
FIG. 9 shows a velocity diagram showing a rotation speed ratio of each element that structures a planetary gear mechanism when a reverse speed is established according to the known automatic transmission for a vehicle.

As illustrated in FIG. 9, according to the known automatic transmission 12 for the vehicle as described in the background section, the second clutch CL12 and the first brake B11 is susceptible to the generation of the burning because a relative rotation speed is increased due to the high speed rotation (rotation speed ratio H) of the second sun gear S12 when establishing a reverse speed stage. This drawback is solved by the automatic transmission 11 for the vehicle of the comparison example shown in 10 and the automatic transmission 1 for the vehicle of the embodiment shown in FIG. 1 as explained below.

According to the automatic transmission 11 for the vehicle of the comparison example shown in 10, as shown in FIG. 11, when establishing the reverse speed stage, the engaged states of the first brake B1 and the second clutch CL2 are established to fix the first sun gear S1 and the second ring gear R2, and the engaged state of the fourth clutch CL4 is established to connect the second carrier C2 and the third carrier C3 to generate the drive force for reverse rotation at the third carrier C3. The drive force for reverse rotation is outputted to the output shaft T via the third carrier C3.

Because the automatic transmission 11 for the vehicle of the comparison example corresponds to the automatic transmission 1 for the vehicle of the embodiment when the switching clutch D is in the "b" state (released state), in order to establish the same condition to the reverse speed stage of the automatic transmission 11 for the vehicle of the comparison example, the engagement states of the second clutch CL2, the fourth clutch CL4, and the first brake B1 are established with the automatic transmission 1 for the vehicle of the embodiment.

Figure 4:
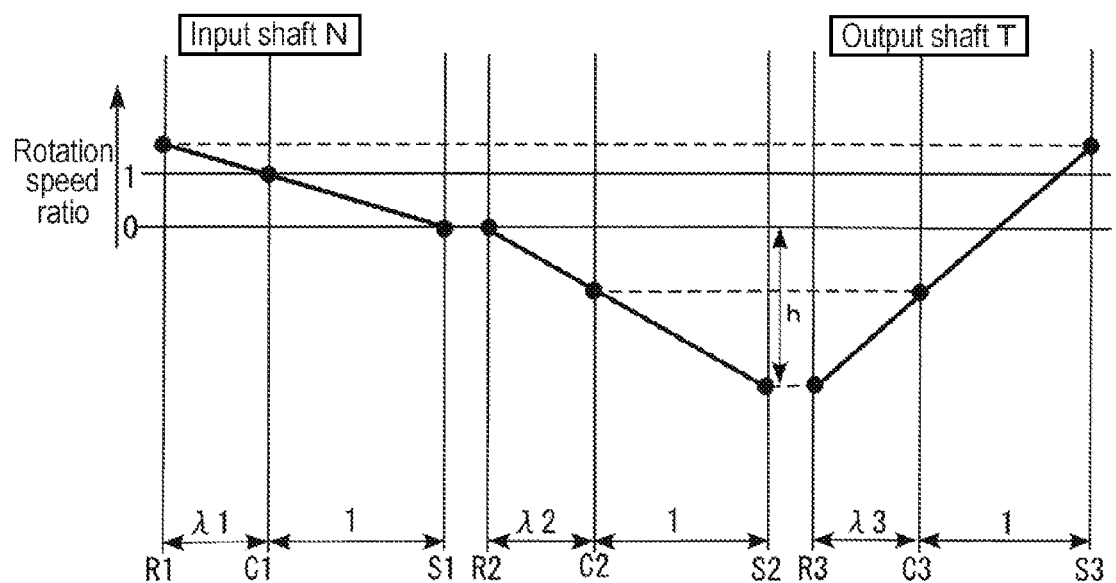
FIG. 4 shows a velocity diagram showing a rotation speed ratio of each element that structures the planetary gear mechanism when a reverse speed is established according to the embodiment disclosed here.

The second sun gear S2 and the third ring gear R3 rotate at the same rotation speed (rotation number) and rotate at higher speed than the rotation (output rotation) of the third carrier C3 when establishing the reverse speed stage according to the automatic transmission 1 for the vehicle. Calculating the rotation speed ratio of the second sun gear S2 of the second planetary gear mechanism P2, because the second ring gear R2 is fixed and the second carrier C2 exerts the output rotation, as shown in FIG. 4, the rotation speed ratio of the second sun gear S2 is obtained as a value h which is obtained by multiplying the output rotation speed ratio and the sum of the reciprocal of the gear ratio $\lambda 2$ (=the number of the second sun gear S2/the number of the second ring gear R2) and one (1). Thus, according to the automatic transmission 1 for the vehicle of the embodiment, the rotation speed ratio h of the second sun gear S2 does not reach the rotation as high as the rotation speed ratio H of the second sun gear S12 of the known automatic transmission 12. Thus, according to the construction of the automatic transmission 1 (11) for the vehicle, the generation of the burning, or the like, of the second clutch CL2 and the first brake B1 can be prevented.

However, when the reverse speed stage is established at the automatic transmission 1 for the vehicle, the second clutch CL2 and the first brake B1 receive the reaction of output. That is, it is necessary that the second clutch CL2 and the first brake B1 receive the reaction with a torque sharing ratio that is expressed by gear ratio $\lambda 1$, $\lambda 2$, $\lambda 3$ of planetary mechanism P1, P2, P3, which brings an increase of the second clutch CL2 and the first brake B1 in size.

Figure 5:
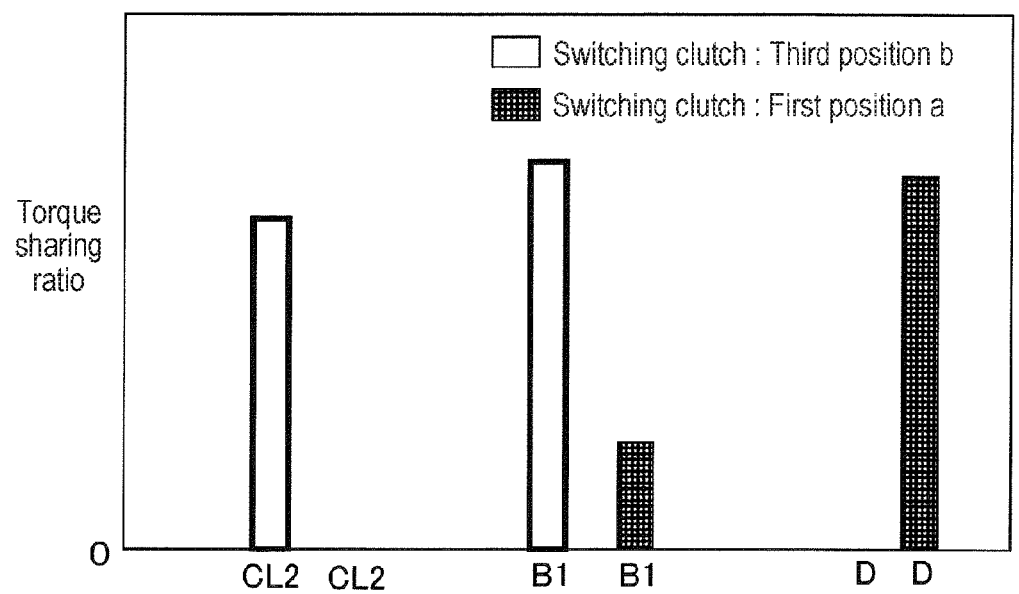
FIG. 5 shows torque sharing ratios that engaged elements receive when the reverse speed is established in a state where a switching clutch is positioned at different positions according to the embodiment disclosed here.

Particularly, the outlined bar positioned at the left for CL2 in FIG. 5 indicates the torque sharing ratio of the second clutch CL2 in a case where the switching clutch D is positioned at the third position b. The outlined bar positioned at the left for B1 in FIG. 5 indicates the torque sharing ratio of the first brake B1 in a case where the switching clutch D is positioned at the third position b. D at the left in FIG. 5 indicates the torque sharing ratio (zero in FIG. 5) of the switching clutch D in a case where the switching clutch D is positioned at the third position b.

According to the automatic transmission 1 for the vehicle, as shown in FIG. 2, when establishing the reverse speed stage, the released state of the second clutch CL2 is maintained, the first sun gear S1 is fixed by establishing the engaged state of the first brake B1, the second ring gear R2 is fixed by establishing the "a" state (i.e., first position a) of the switching clutch D, and the second carrier C2 and the third carrier C3 are connected by establishing the engaged stage of the fourth clutch CL4. Thus, the drive force for reverse rotation is generated at the third carrier C3.

Thus, because the second clutch CL2 is in a released state, the torque sharing ratio of the second clutch CL2 is assumed to be zero (0), the torque sharing ratio of the first brake B1 is assumed to be a value as small as a value of a case where the first brake B1 is not engaged simultaneous with the second clutch CL2, and the switching clutch D shares most portion of the torque. Accordingly, the second clutch CL2 and the first brake B1 can be downsized by the reduction of the number of friction members and the dimension of an actuator chamber, and thus, manufacturing costs of the transmission can be reduced, and further, the transmission per se can be downsized and degree of freedom in design, or in an internal construction can be enhanced.

More particularly, the right-hand side CL2 in FIG. 5 shows the torque sharing ratio (zero in FIG. 5) of the second clutch CL2 when the switching clutch D is positioned at the first position a. The hatched bar shown at the right-hand side for B1 in FIG. 5 shows the torque sharing ratio of the first brake B1 when the switching clutch D is positioned at the first position a. The hatched bar shown at the right-hand side for D in FIG. 5 shows the torque sharing ratio of the switching clutch D when the switching clutch D is positioned at the first position a. As clearly shown in FIG. 5, the torque sharing ratio of the second clutch CL2 and the first brake B1 can be significantly reduced in a case where the reverse speed stage is established by switching the switching clutch D to the first position a and the engaged states of the fourth clutch CL4 and the first brake B1 are established compared to a case where the reverse speed stage is established by switching the switching clutch D to the first position b and the engaged states of the second, fourth clutches CL2, CL4, and the first brake B1 are established.

Further, when the reverse speed stage is established by switching the switching clutch D to the first position a and the engaged states of the fourth clutch CL4 and the first brake B1 are established, the second sun gear S2 and the third ring gear R3 rotate at the same rotation speed (rotation number) and rotate at higher speed than the rotation (output rotation) of the third carrier C3. However, because the second ring gear R2 is fixed and the second carrier C2 exerts the output rotation, the rotation of the second sun gear S2 does not reach the high speed rotation compared to the known automatic transmission 12 for the vehicle. Thus, the generation of the burning or the like of the second clutch CL2 and the first brake B1 can be prevented.

Further, according to the automatic transmission 1 for the vehicle, when establishing the reverse speed stage, because the first carrier C1 is inputted with the rotation of the input shaft N and the first sun gear S1 is fixed by the first brake B1, the rotation of the first ring gear R1 is increased and the first ringer R1 obtains the same rotation speed to the rotation when the fifth, the seventh, the ninth to twelfth speed stages among forward speeds are established, peculiar rotation particular to the reverse speed stage is not generated. Further, according to the automatic transmission 1 for the vehicle, by the application of a dog clutch as the switching clutch D, the above-explained advantages and effects can be attained without additionally providing a dragging element, and thus the deterioration of the fuel consumption can be restrained.

Figure 6:
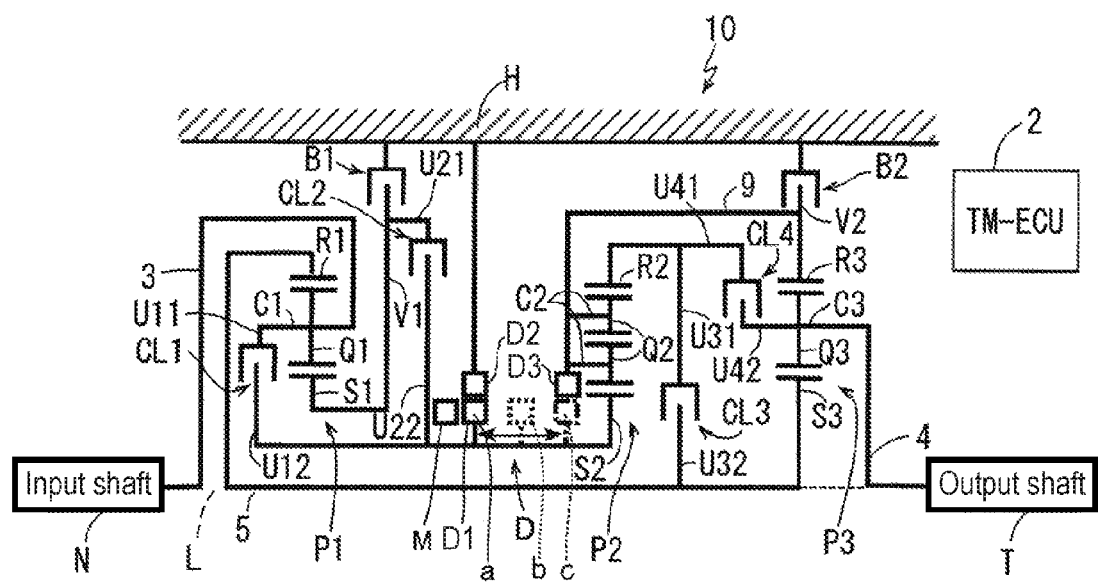
FIG. 6 is a schematic diagram of an automatic transmission for a vehicle according to a modified example of the embodiment disclosed here.
Figures 7, 8:
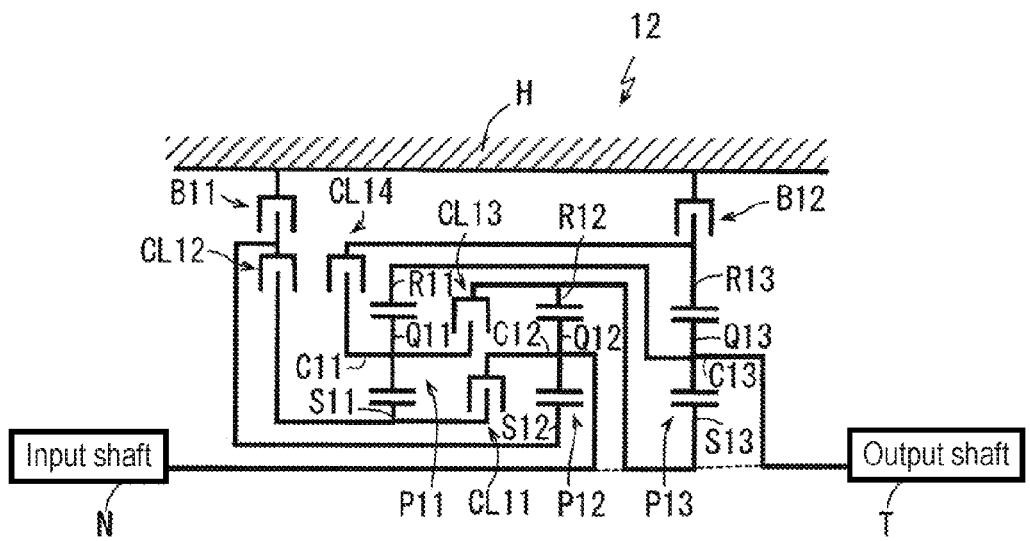
FIG. 7 is a schematic diagram of a known automatic transmission for a vehicle.
FIG. 8 shows operation states of brakes and clutches at each of speed stages according to the known automatic transmission for a vehicle.

A mechanical structure of an automatic transmission for a vehicle according to a modified example of the embodiment will be explained as follows. Schematic construction of the modified example of the automatic transmission 1 for the vehicle according to the embodiment will be explained with reference to illustrations of FIG. 6. In FIG. 6, the same numeral references are provided for the same members to the members shown in FIG. 1 and detailed explanations will not be repeated. An automatic transmission 10 for a vehicle according to the modified example includes a different construction from the automatic transmission 1 for the vehicle of the embodiment with respect to a point that a double pinion type planetary gear mechanism instead of a single pinion type planetary gear mechanism is applied as the second planetary gear mechanism P2. According to the modified example, because the double pinion type planetary gear mechanism is applied as the second planetary gear mechanism P2, the second carrier C2 corresponds to a first element, the second ring gear R2 corresponds to a second element, and the second sun gear S2 corresponds to a third element of the disclosure in an arrangement order in the velocity diagram.

According to the automatic transmission 10 for the vehicle, the second carrier C2 and the third ring gear R3 are connected via a third gear connection member 9. A first end of the first clutch CL1 is connected to the first carrier C1 via the first portion U11 of the first-clutch connection member. A second end of the first clutch CL1 is connected to the second sun gear S2 via the second portion U12 of the clutch connection member. The first clutch CL1 selectively connects the first carrier C1 and the second sun gear S2 (the first clutch CL1 connects the first carrier C1 and the second sun gear S2 to be disengageable).

The switching clutch D switches positions to a first position a for selectively fixing the second sun gear S2 to the housing H via the first portion U12 of the first-clutch connection member, to a second position c for selectively fixing the second sun gear S2 to the second carrier C2 connected to the third gear connection member 9 and the third ring gear R3, and to a third position b where the second sun gear S2 is free from the housing H and from the second carrier C2 and the third ring gear R3.

With the construction of the automatic transmission 10 for the vehicle according to the modified example, similar advantages and effects to the automatic transmission 1 for the vehicle can be attained.

According to the embodiment, an automatic transmission includes a housing (H), and three planetary gear mechanisms including a first planetary gear mechanism (P1) which is a single pinion type planetary gear mechanism, a second planetary gear mechanism (P2) which is one of a single pinion type planetary gear mechanism and a double pinion type planetary gear mechanism, and a third planetary gear mechanism (P3) which is a single pinion type planetary gear mechanism, the first planetary gear mechanism (P1), the second planetary gear mechanism (P2), and the third planetary gear mechanism (P3) being supported by the housing (H) and being coaxial to a rotation axis (L); a sun gear (S2), a carrier (C2), and a ring gear (R2) of the second planetary gear mechanism (P2) in an arranged order in a velocity diagram being defined as a first element, a second element, and a third element, respectively, in a case where the single pinion type planetary gear mechanism is applied as the second planetary gear mechanism; the carrier (C2), the ring gear (R2), and the sun gear (S2) of the second planetary gear mechanism (P2) in an arranged order in a velocity diagram being defined as the first element, the second element, and the third element, respectively, in a case where the double pinion type planetary gear mechanism is applied as the second planetary gear mechanism (P2); a ring gear (R1) of the first planetary gear mechanism and a sun gear (S3) of the third planetary gear mechanism being connected to each other, and the first element of the second planetary gear mechanism (P2) and a ring gear (R3) of the third planetary gear mechanism being connected to each other. The automatic transmission further includes an Input shaft (N) supported by the housing (H) to be rotatable about the rotation axis (L), the input shaft (N) connected to a carrier (C1) of the first planetary gear mechanism, an output shaft (T) supported by the housing (H) to be rotatable about the rotation axis (L), the output shaft (T) connected to a carrier (C3) of the third planetary gear mechanism (P3), a first brake (B1) selectively fixing a sun gear (S1) of the first planetary gear mechanism (P1) to the housing (H), a second brake (B2) selectively fixing the first element and the ring gear (R3) of the third planetary gear mechanism (P3) which are connected to each other to the housing (H), a switching clutch (D) being switchable to a first position (a) where the third element is selectively fixed to the housing (H), to a second position (c) where the third element is selectively fixed to the first element and the ring gear (R3) of the third planetary gear mechanism (P3), or to a third position (b) where the third element is free from the housing (H) and is free from the first element and the ring gear (R3) of the third planetary gear mechanism (P3), a first clutch (CL1) selectively connecting the carrier (C1) of the first planetary gear mechanism (P1) and the third element, a second clutch (CL2) selectively connecting the sun gear (S1) of the first planetary gear mechanism (P1) and the third element, a third clutch (CL3) selectively connecting the ring gear (R1) of the first planetary gear mechanism (P1) and the second element, and a fourth clutch (CL4) selectively connecting the second element and the carrier (C3) of the third planetary gear mechanism (P3). The first brake (B1) fixes the sun gear (S1) of the first planetary gear mechanism (P1) to the housing (H), the switching clutch (D) fixes the third element to the housing (H), and the fourth clutch (CL4) connects the second element to the carrier (C3) of the third planetary gear mechanism (P3) when establishing a reverse speed stage.

According to the automatic transmission (1) for the vehicle of the embodiment, when establishing a reverse speed stage, a drive force for reverse rotation is generated at the second element (C2, R2) of the second planetary gear mechanism. The drive force for reverse rotation is outputted to the output shaft (T) via the carrier of the third planetary gear mechanism (third carrier C3). The first element of the second planetary gear mechanism (P2) and the ring gear of the third planetary gear mechanism (third ring gear R3) rotate at the same rotation speed (rotation number) and rotate at higher speed than the rotation (output rotation) of the carrier of the third planetary gear mechanism (third carrier C3). However, the rotation of the first element of the second planetary gear mechanism (P2) does not reach high speed compared to the known automatic transmission for the vehicle because the third element of the second planetary gear mechanism is fixed and the second element of the second planetary gear mechanism excerpts an output rotation.

According to the embodiment, the automatic transmission further includes a connection member for first brake (V1) being connected to the sun gear (S1) of the first planetary gear mechanism, a connection member for first clutch (U12) being connected to the third element (R2, S2), and a connection member for fourth clutch (U41, U42) having a first portion (U41, U42) connected to the carrier (C3) of the third planetary gear mechanism and a second portion (U42, U41) connected to the second element (C2, R2) at a side where the input shaft is located. The first planetary gear mechanism (P1) which is the single pinion type planetary gear mechanism, the second planetary gear mechanism (P2) which is the single pinion type planetary gear mechanism, and the third planetary gear mechanism (P3) which is the single pinion type planetary gear mechanism are arranged in a mentioned order from the side where the input shaft (N) is located to a side where the output shaft (T) is located. The first brake (B1) brakes a rotation of the sun gear (S1) of the first planetary gear mechanism (P1) via the connection member (U12) for first brake, the switching clutch (D) brakes a rotation of the third element via the connection member (U12) for first clutch, and the fourth clutch (CL4) is connected to the carrier (C3) of the third planetary gear mechanism via the first portion (U41, U42) of the connection member for fourth clutch and selectively connects the second element and the carrier (C3) of the third planetary gear mechanism (P3) via the second portion (U42, U41) of the connection member for fourth clutch.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An automatic transmission, comprising:
a housing;
three planetary gear mechanisms including a first planetary gear mechanism which is a single pinion planetary gear mechanism, a second planetary gear mechanism which is one of a single pinion planetary gear mechanism and a double pinion planetary gear mechanism and which comprises a first element, a second element, and a third element, and a third planetary gear mechanism which is a single pinion planetary gear mechanism, the first planetary gear mechanism, the second planetary gear mechanism, and the third planetary gear mechanism being supported by the housing and being coaxial to a rotation axis; a sun gear, a carrier, and a ring gear of the second planetary gear mechanism being defined as the first element, the second element, and the third element, respectively, of the second planetary gear mechanism, in a case where the single pinion planetary gear mechanism is applied as the second planetary gear mechanism; the carrier, the ring gear, and the sun gear of the second planetary gear mechanism being defined as the first element, the second element, and the third element, respectively, of the second planetary gear mechanism, in a case where the double pinion planetary gear mechanism is applied as the second planetary gear mechanism; a ring gear of the first planetary gear mechanism and a sun gear of the third planetary gear mechanism being connected to each other, and the first element of the second planetary gear mechanism and a ring gear of the third planetary gear mechanism being connected to each other;
an input shaft supported by the housing to be rotatable about the rotation axis, the input shaft connected to a carrier of the first planetary gear mechanism;
an output shaft supported by the housing to be rotatable about the rotation axis, the output shaft connected to a carrier of the third planetary gear mechanism;
a first brake selectively fixing a sun gear of the first planetary gear mechanism to the housing;
a second brake selectively fixing the first element and the ring gear of the third planetary gear mechanism which are connected to each other to the housing;
a switching clutch being switchable to a first position where the third element is selectively fixed to the housing, to a second position where the third element is selectively fixed to the first element and the ring gear of the third planetary gear mechanism, or to a third position where the third element is free from the housing and is free from the first element and the ring gear of the third planetary gear mechanism;
a first clutch selectively connecting the carrier of the first planetary gear mechanism and the third element;
a second clutch selectively connecting the sun gear of the first planetary gear mechanism and the third element;
a third clutch selectively connecting the ring gear of the first planetary gear mechanism and the second element; and
a fourth clutch selectively connecting the second element and the carrier of the third planetary gear mechanism; wherein
the first brake fixes the sun gear of the first planetary gear mechanism to the housing, the switching clutch fixes the third element to the housing, and the fourth clutch connects the second element to the carrier of the third planetary gear mechanism when establishing a reverse speed stage.

2. The automatic transmission according to claim 1 further comprising:
a connection member for first brake being connected to the sun gear of the first planetary gear mechanism;
a connection member for first clutch being connected to the third element;
a connection member for fourth clutch having a first portion connected to the carrier of the third planetary gear mechanism and a second portion connected to the second element at a side where the input shaft is located; wherein
the first planetary gear mechanism which is the single pinion planetary gear mechanism, the second planetary gear mechanism which is the single pinion planetary gear mechanism, and the third planetary gear mechanism which is the single pinion planetary gear mechanism are arranged in a mentioned order from the side where the input shaft is located to a side where the output shaft is located;
the first brake brakes a rotation of the sun gear of the first planetary gear mechanism via the connection member for first brake;
the switching clutch brakes a rotation of the third element via the connection member for first clutch; and
the fourth clutch is connected to the carrier of the third planetary gear mechanism via the first portion of the connection member for fourth clutch and selectively connects the second element and the carrier of the third planetary gear mechanism via the second portion of the connection member for fourth clutch.

* * * * *